(12) United States Patent
Zhou (10) Patent No.: US 8,913,186 B2
(45) Date of Patent: *Dec. 16, 2014

(54) MOTION ADAPTIVE FILTER AND DEINTERLACER AND METHODS FOR USE THEREWITH

(71) Applicant: ViXS Systems, Inc., Toronto (CA)

(72) Inventor: Hui Zhou, Toronto (CA)

(73) Assignee: ViXS Systems, Inc., Toronto, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/060,108

(22) Filed: Oct. 22, 2013

(65) Prior Publication Data

US 2014/0043530 A1    Feb. 13, 2014

Related U.S. Application Data

(63) Continuation of application No. 13/595,243, filed on Aug. 27, 2012, now Pat. No. 8,629,937.

(60) Provisional application No. 61/675,690, filed on Jul. 25, 2012.

(51) Int. Cl.
*H04N 11/20* (2006.01)
*H04N 7/01* (2006.01)

(52) U.S. Cl.
CPC ............... *H04N 7/014* (2013.01); *H04N 7/012* (2013.01); *H04N 7/0137* (2013.01)
USPC .......................................... 348/452; 348/448

(58) Field of Classification Search
CPC ... H04N 7/0177; H04N 7/012; H04N 7/0125; H04N 7/0127; H04N 7/0135; H04N 7/0137; H04N 7/014; H04N 7/0142; H04N 7/0145; H04N 5/145
USPC ......... 348/448, 449, 452, 700, 701, 607, 606, 348/445, 626, 604; 375/240.29
See application file for complete search history.

(56) References Cited

U.S. PATENT DOCUMENTS

| | | | | |
|---|---|---|---|---|
| 5,682,205 A * | 10/1997 | Sezan et al. | | 348/452 |
| 6,124,900 A * | 9/2000 | Clatanoff et al. | | 348/701 |
| 6,414,719 B1 * | 7/2002 | Parikh | | 348/448 |
| 7,973,858 B2 * | 7/2011 | Pai et al. | | 348/452 |
| 8,018,530 B2 * | 9/2011 | Lu | | 348/448 |
| 8,284,839 B2 * | 10/2012 | Chang et al. | | 375/240.16 |
| 2002/0149703 A1 * | 10/2002 | Adams et al. | | 348/700 |
| 2004/0160529 A1 * | 8/2004 | Nagakura et al. | | 348/452 |
| 2004/0189865 A1 * | 9/2004 | Chen et al. | | 348/448 |
| 2004/0207753 A1 * | 10/2004 | Jung | | 348/452 |
| 2004/0233326 A1 * | 11/2004 | Yoo et al. | | 348/452 |
| 2005/0110902 A1 * | 5/2005 | Yang | | 348/452 |
| 2005/0122426 A1 * | 6/2005 | Winger et al. | | 348/452 |
| 2005/0253963 A1 * | 11/2005 | Wong | | 348/452 |
| 2006/0164559 A1 * | 7/2006 | Chou et al. | | 348/700 |

(Continued)

*Primary Examiner* — Victor Kostak
(74) *Attorney, Agent, or Firm* — Garlick & Markison; Bruce E. Stuckman (57) ABSTRACT

A device for use in conjunction with a video processing device includes an adaptive filter for processing input pictures into selectively filtered pictures, based on a filter motion data. A deinterlacer selectively interpolates the selectively filtered pictures into selectively deinterlaced pictures, based on deinterlace motion data. A motion detector generates the filter motion data and the deinterlace motion data, based on detecting motion in the input pictures.

19 Claims, 9 Drawing Sheets

(56) References Cited

U.S. PATENT DOCUMENTS

| | | | |
|---|---|---|---|
| 2006/0238650 A1* | 10/2006 | Wredenhagen et al. | 348/452 |
| 2008/0151101 A1* | 6/2008 | Tian et al. | 348/448 |
| 2008/0158416 A1* | 7/2008 | Lu | 348/452 |
| 2008/0175473 A1* | 7/2008 | Kim | 382/172 |
| 2010/0309378 A1* | 12/2010 | Zhong | 348/607 |
| 2012/0092553 A1* | 4/2012 | Lu | 348/441 |
| 2012/0162525 A1* | 6/2012 | Schoner et al. | 348/607 |
| 2012/0320265 A1* | 12/2012 | Balram et al. | 348/448 |

* cited by examiner

MOTION ADAPTIVE FILTER AND DEINTERLACER AND METHODS FOR USE THEREWITH

CROSS REFERENCE TO RELATED APPLICATIONS

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

1. U.S. Utility application Ser. No. 13/595,243, entitled "MOTION ADAPTIVE FILTER AND DEINTERLACER AND METHODS FOR USE THEREWITH," filed Aug. 27, 2012, which claims priority pursuant to 35 U.S.C. §119(e) to the following U.S. Provisional Patent Applications which are hereby incorporated herein by reference in their entirety and made part of the present U.S. Utility Patent Application for all purposes:
    a. U.S. Provisional Application Ser. No. 61/675,690, entitled "MOTION ADAPTIVE FILTER AND DEINTERLACER AND METHODS FOR USE THEREWITH," filed Jul. 25, 2012.

TECHNICAL FIELD OF THE INVENTION

The present invention relates to deinterlacing and filtering and related methods used in devices such as video processing devices.

DESCRIPTION OF RELATED ART

Video encoding has become an important issue for modern video processing devices. Robust encoding algorithms allow video signals to be transmitted with reduced bandwidth and stored in less memory. Standards have been promulgated for many encoding methods including the H.264 standard that is also referred to as MPEG-4, part 10 or Advanced Video Coding, (AVC).

Video filters such as noise filters or comb filters are frequently used before video encoding or display to improve picture quality or to enhance picture detail. Video filters can remove noise, reduce discolorations in picture detail, provide purer color and reduce or eliminate video artifacts such as dot crawl and rainbow swirls. These filters work well when a picture is stationary, however, motion in the video image can produce undesirable picture degradation. Therefore, these filters are usually motion-adaptive and a motion detection device is usually implemented with these filters.

Many video signals are processed in an interlaced format where frames of video signals are separated into odd and even fields that are alternately displayed to produce the illusion of a single image. For example, in NTSC standard video signals, odd and even fields are interlaced every $60^{th}$ of a second to produce frames at an overall rate of 30 frames per second. In addition, other standard video formats are interlaced such as 480i 720i, 1080i, etc. Deinterlacing is the process of reconstructing whole frames from interlaced frames, for instance when an interlaced signal is converted to a progressive scan signal, such as a 480p, 720p or 1080p formatted signal.

Deinterlacing algorithms produce undesirable artifacts that are visible to the viewer. The efficient and accurate deinterlacing of video signals is important to the implementation of many video devices, particularly video devices that are destined for home use.

Further limitations and disadvantages of conventional and traditional approaches will become apparent to one of ordinary skill in the art through comparison of such systems with the present invention.

DETAILED DESCRIPTION OF THE INVENTION INCLUDING THE PRESENTLY PREFERRED EMBODIMENTS

Figure 1:
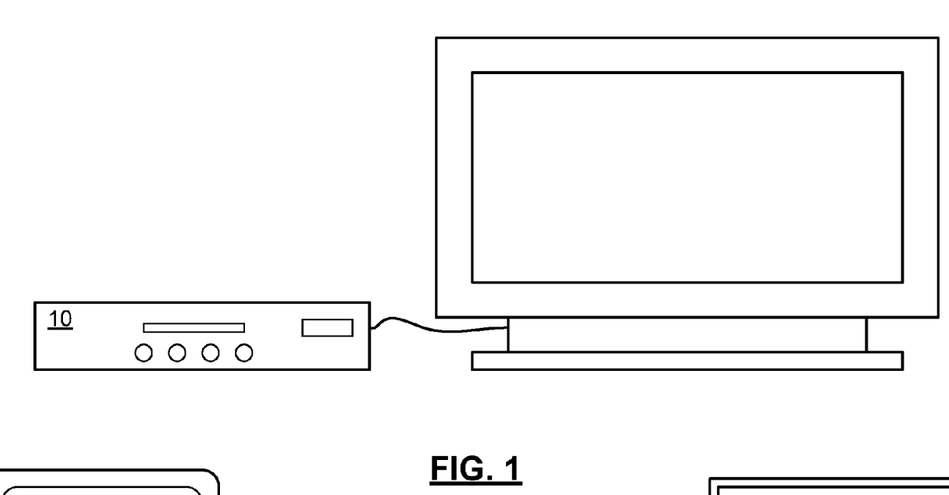
FIGS. 1-3 present pictorial diagram representations of various video devices in accordance with embodiments of the present invention.
Figure 2:
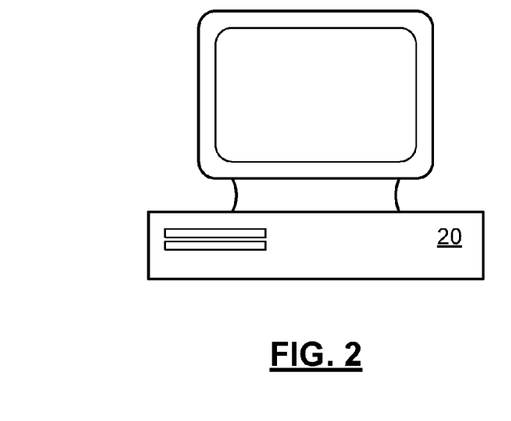
Figure 3:
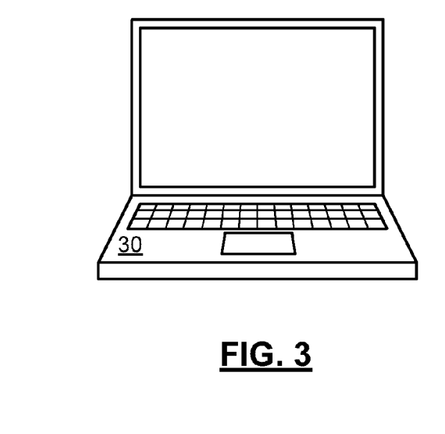

FIGS. 1-3 present pictorial diagram representations of various video devices in accordance with embodiments of the present invention. In particular, set top box 10 with built-in digital video recorder functionality or a stand alone digital video recorder, computer 20 and portable computer 30 illustrate electronic devices that incorporate a video processing device that includes one or more features or functions of the present invention. While these particular devices are illustrated, such a video processing device includes any device that is capable of encoding, decoding and/or transcoding video content in accordance with the methods and systems described in conjunction with FIGS. 4-14 and the appended claims.

Figure 4:
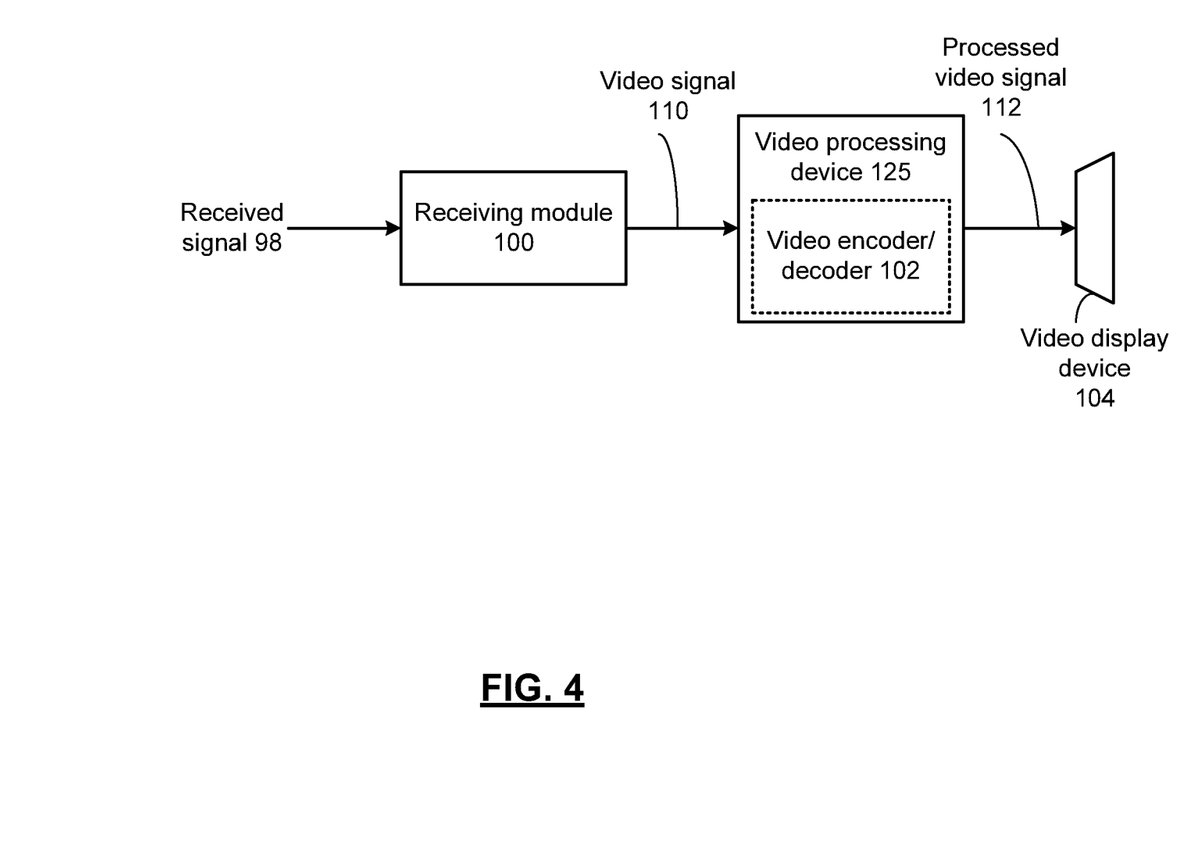
FIG. 4 presents a block diagram representation of a video device in accordance with an embodiment of the present invention.

FIG. 4 presents a block diagram representation of a video device in accordance with an embodiment of the present invention. In particular, this video device includes a receiving module 100, such as a television receiver, cable television receiver, satellite broadcast receiver, broadband modem, 3G transceiver or other information receiver or transceiver that is capable of receiving a received signal 98 and extracting one or more video signals 110 via time division demultiplexing, frequency division demultiplexing or other demultiplexing technique. Video processing device 125 includes video encoder/decoder 102 and is coupled to the receiving module 100 to encode, decode or transcode the video signal for storage, editing, and/or playback in a format corresponding to video display device 104.

In an embodiment of the present invention, the received signal 98 is a broadcast video signal, such as a television signal, high definition television signal, enhanced definition television signal or other broadcast video signal that has been transmitted over a wireless medium, either directly or through one or more satellites or other relay stations or through a cable network, optical network or other transmission network. In addition, received signal 98 can be generated from a stored video file, played back from a recording medium such as a magnetic tape, magnetic disk or optical disk, and can include a streaming video signal that is transmitted over a public or private network such as a local area network, wide area network, metropolitan area network or the Internet.

Video signal 110 can include an analog video signal that is formatted in any of a number of video formats including National Television Systems Committee (NTSC), Phase Alternating Line (PAL) or Sequentiel Couleur Avec Memoire (SECAM) of other analog format. Processed video signal 112 can include a digital video signal complying with a digital video codec standard such as H.264, MPEG-4 Part 10 Advanced Video Coding (AVC) or another digital format such as a Motion Picture Experts Group (MPEG) format (such as MPEG1, MPEG2 or MPEG4), Quicktime format, Real Media format, Windows Media Video (WMV) or Audio Video Interleave (AVI), etc. Video signal 110 can, in the alternative, include a digital video signal—particularly when the encoder/decoder 102 operates to decode or transcode the video signal 110.

Video display devices 104 can include a television, monitor, computer, handheld device or other video display device that creates an optical image stream either directly or indirectly, such as by projection, based on decoding the processed video signal 112 either as a streaming video signal or by playback of a stored digital video file. While shown as a separate device, video processing device 125 can be incorporated in to receiving module 100, video display device 104 or both.

Figure 5:
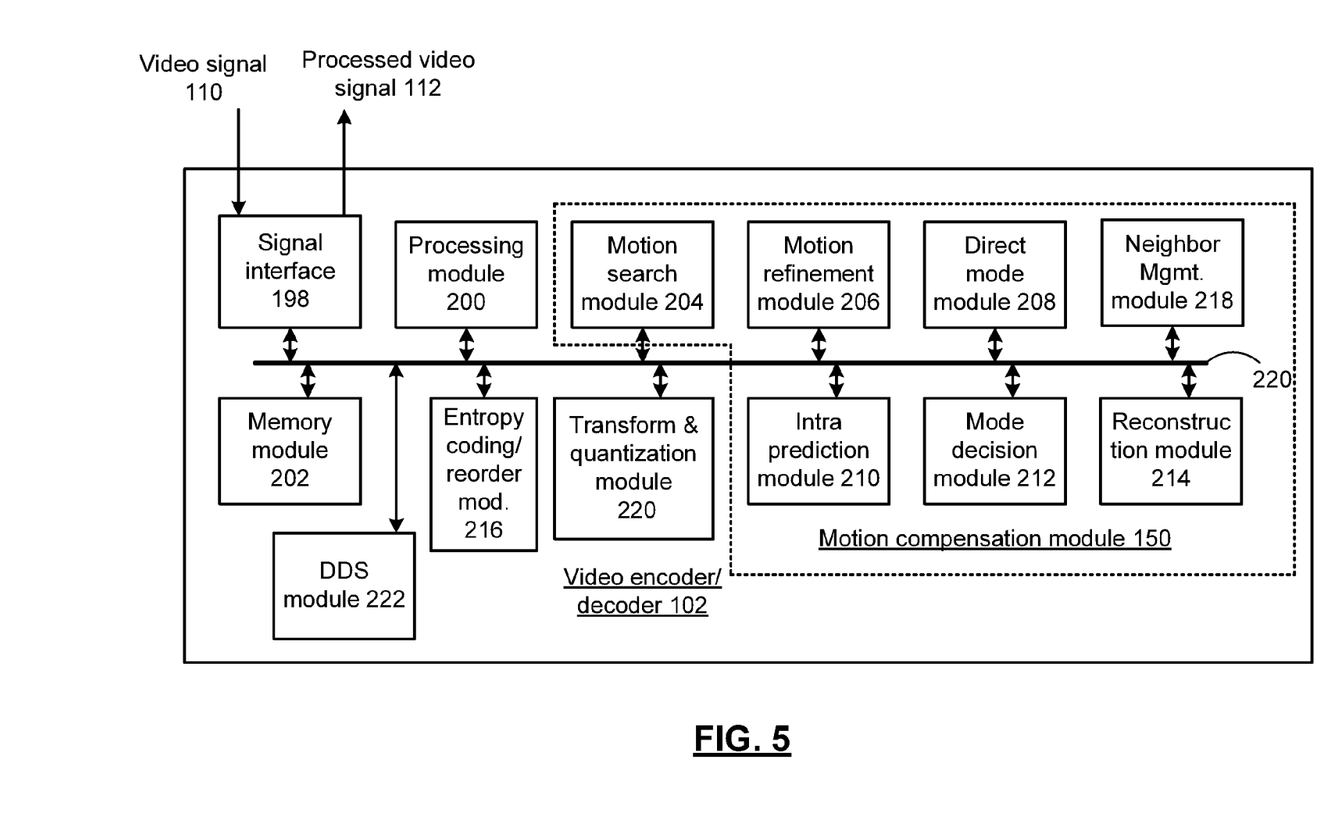
FIG. 5 presents a block diagram representation of a video encoder/decoder 102 in accordance with an embodiment of the present invention.

FIG. 5 presents a block diagram representation of a video encoder/decoder 102 in accordance with an embodiment of the present invention. In particular, video encoder/decoder 102 can be a video codec that operates in accordance with many of the functions and features of the H.264 standard, the MPEG-4 standard, VC-1 (SMPTE standard 421M) or other standard, to process processed video signal 112 to encode, decode or transcode video input signal 110. Video input signal 110 is optionally formatted by signal interface 198 for encoding, decoding or transcoding.

The video encoder/decoder 102 includes a processing module 200 that can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 202. Memory module 202 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Processing module 200, and memory module 202 are coupled, via bus 221, to the signal interface 198 and a plurality of other modules, such as motion search module 204, motion refinement module 206, direct mode module 208, intra-prediction module 210, mode decision module 212, reconstruction module 214, entropy coding/reorder module 216, neighbor management module 218, forward transform and quantization module 220 and denoising/deinterlacing/scaling (DDS) module 222. The modules of video encoder/decoder 102 can be implemented in software or firmware and be structured as operations performed by processing module 200. Alternatively, one or more of these modules can be implemented using a hardware engine that includes a state machine, analog circuitry, digital circuitry, and/or logic circuitry, and that operates either independently or under the control and/or direction of processing module 200 or one or more of the other modules, depending on the particular implementation. It should also be noted that the software implementations of the present invention can be stored on a tangible storage medium such as a magnetic or optical disk, read-only memory or random access memory and also be produced as an article of manufacture. While a particular bus architecture is shown, alternative architectures using direct connectivity between one or more modules and/or additional busses can likewise be implemented in accordance with the present invention.

Video encoder/decoder 102 can operate in various modes of operation that include an encoding mode and a decoding mode that is set by the value of a mode selection signal that may be a user defined parameter, user input, register value, memory value or other signal. In addition, in video encoder/decoder 102, the particular standard used by the encoding or decoding mode to encode, transcode or decode the input signal can be determined by a standard selection signal that also may be a user defined parameter, user input, register value, memory value or other signal. In an embodiment of the present invention, the operation of the encoding mode utilizes a plurality of modules that each perform a specific encoding function. The operation of decoding also utilizes at least one of these plurality of modules to perform a similar function in decoding. In this fashion, modules such as the motion refinement module 206 and more particularly an interpolation filter used therein, and intra-prediction module 210, can be used in both the encoding and decoding process to save on architectural real estate when video encoder/decoder 102 is implemented on an integrated circuit or to achieve other efficiencies. In addition, some or all of the components of the direct mode module 208, mode decision module 212, reconstruction module 214, transformation and quantization module 220, DDS module 222 or other function specific modules can be used in both the encoding and decoding process for similar purposes.

Motion compensation module 150 includes a motion search module 204 that processes pictures from the video input signal 110 based on a segmentation into macroblocks of pixel values, such as of 16 pixels by 16 pixels size, from the columns and rows of a frame and/or field of the video input signal 110. In an embodiment of the present invention, the motion search module determines, for each macroblock or macroblock pair of a field and/or frame of the video signal one or more motion vectors that represents the displacement of the macroblock (or subblock) from a reference frame or reference field of the video signal to a current frame or field. In operation, the motion search module operates within a search range to locate a macroblock (or subblock) in the current frame or field to an integer pixel level accuracy such as to a resolution of 1-pixel. Candidate locations are evaluated based on a cost formulation to determine the location and corresponding motion vector that have a most favorable (such as lowest) cost.

In an embodiment of the present invention, a cost formulation is based on the Sum of Absolute Difference (SAD) between the reference macroblock and candidate macroblock pixel values and a weighted rate term that represents the number of bits required to be spent on coding the difference between the candidate motion vector and either a predicted motion vector (PMV) that is based on the neighboring macroblock to the right of the current macroblock and on motion vectors from neighboring current macroblocks of a prior row of the video input signal or an estimated predicted motion vector that is determined based on motion vectors from neighboring current macroblocks of a prior row of the video input signal. In an embodiment of the present invention, the cost calculation avoids the use of neighboring subblocks within the current macroblock. In this fashion, motion search module 204 is able to operate on a macroblock to contemporaneously determine the motion search motion vector for each subblock of the macroblock.

A motion refinement module 206 generates a refined motion vector for each macroblock of the plurality of macroblocks, based on the motion search motion vector. In an embodiment of the present invention, the motion refinement module determines, for each macroblock or macroblock pair of a field and/or frame of the video input signal 110, a refined motion vector that represents the displacement of the macroblock from a reference frame or reference field of the video signal to a current frame or field.

Based on the pixels and interpolated pixels, the motion refinement module 206 refines the location of the macroblock in the current frame or field to a greater pixel level accuracy such as to a resolution of ¼-pixel or other sub-pixel resolution. Candidate locations are also evaluated based on a cost formulation to determine the location and refined motion vector that have a most favorable (such as lowest) cost. As in the case with the motion search module, a cost formulation can be based on the a sum of the Sum of Absolute Difference (SAD) between the reference macroblock and candidate macroblock pixel values and a weighted rate term that represents the number of bits required to be spent on coding the difference between the candidate motion vector and either a predicted motion vector (PMV) that is based on the neighboring macroblock to the right of the current macroblock and on motion vectors from neighboring current macroblocks of a prior row of the video input signal or an estimated predicted motion vector that is determined based on motion vectors from neighboring current macroblocks of a prior row of the video input signal. In an embodiment of the present invention, the cost calculation avoids the use of neighboring subblocks within the current macroblock. In this fashion, motion refinement module 206 is able to operate on a macroblock to contemporaneously determine the motion search motion vector for each subblock of the macroblock.

When estimated predicted motion vectors are used, the cost formulation avoids the use of motion vectors from the current row and both the motion search module 204 and the motion refinement module 206 can operate in parallel on an entire row of video input signal 110, to contemporaneously determine the refined motion vector for each macroblock in the row.

A direct mode module 208 generates a direct mode motion vector for each macroblock, based on macroblocks that neighbor the macroblock. In an embodiment of the present invention, the direct mode module 208 operates to determine the direct mode motion vector and the cost associated with the direct mode motion vector based on the cost for candidate direct mode motion vectors for the B slices of video input signal 110, such as in a fashion defined by the H.264 standard.

While the prior modules have focused on inter-prediction of the motion vector, intra-prediction module 210 generates a best intra prediction mode for each macroblock of the plurality of macroblocks. In an embodiment of the present invention, intra-prediction module 210 operates as defined by the H.264 standard, however, other intra-prediction techniques can likewise be employed. In particular, intra-prediction module 210 operates to evaluate a plurality of intra prediction modes such as a Intra-4×4 or Intra-16×16, which are luma prediction modes, chroma prediction (8×8) or other intra coding, based on motion vectors determined from neighboring macroblocks to determine the best intra prediction mode and the associated cost.

A mode decision module 212 determines a final macroblock cost for each macroblock of the plurality of macroblocks based on costs associated with the refined motion vector, the direct mode motion vector, and the best intra prediction mode, and in particular, the method that yields the most favorable (lowest) cost, or an otherwise acceptable cost. A reconstruction module 214 completes the motion compensation by generating residual luma and/or chroma pixel values for each macroblock of the plurality of macroblocks.

A forward transform and quantization module 220 of video encoder/decoder 102 generates processed video signal 112 by transforming coding and quantizing the residual pixel values into quantized transformed coefficients that can be further coded, such as by entropy coding in entropy coding module 216. In an embodiment of the present invention, further formatting and/or buffering can optionally be performed by signal interface 198 and the processed video signal 112 can be represented as being output therefrom.

As discussed above, many of the modules of motion compensation module 150 operate based on motion vectors determined for neighboring macroblocks. Neighbor management module 218 generates and stores neighbor data for at least one macroblock of the plurality of macroblocks for retrieval by at least one of the motion search module 204, the motion refinement module 206, the direct mode module 208, intra-prediction module 210, entropy coding module 216 and DDS module 222, when operating on at least one neighboring macroblock of the plurality of macroblocks. In an embodiment of the present invention, a data structure, such as a linked list, array or one or more registers are used to associate and store neighbor data for each macroblock in a buffer, cache, shared memory or other memory structure for later retrieval.

The motion search module 204 and/or the motion refinement module 206, can generate at least one predicted motion vector (such as a standard PMV or estimated predicted motion vector) for each macroblock of the plurality of macroblocks using retrieved neighbor data. Further, the direct mode module 208 can generate at least one direct mode motion vector for each macroblock of the plurality of macroblocks using retrieved neighbor data and the intra-prediction module 210 can generate the best intra prediction mode for each macroblock of the plurality of macroblocks using retrieved neighbor data, and the coding module 216 can use retrieved neighbor data in entropy coding, each as set forth in the H.264 standard, the MPEG-4 standard, VC-1 (SMPTE standard 421M) or by other standard or other means.

While not expressly shown, video encoder/decoder 102 can include a memory cache, shared memory, a memory management module, and/or other module to support the encoding, decoding or transcoding of video input signal 110 into processed video signal 112.

DDS module 222 can include a denoise filter such as a temporal or spatial filter that filters noise, or other video artifacts such as deblocking filter, a comb filter or other video filter. The DDS module also includes a deinterlacer for deinterlacing a video signal and a scaler for scaling the video signal. In an embodiment of the present invention, the DDS module 222 also includes a motion detector that generates a motion data that can be used to adapt the denoise filter and or the deinterlacer. Further details regarding the operation of DDS module 222 will be described in greater detail in conjunction with FIGS. 6-8 and 11-14.

Figure 6:
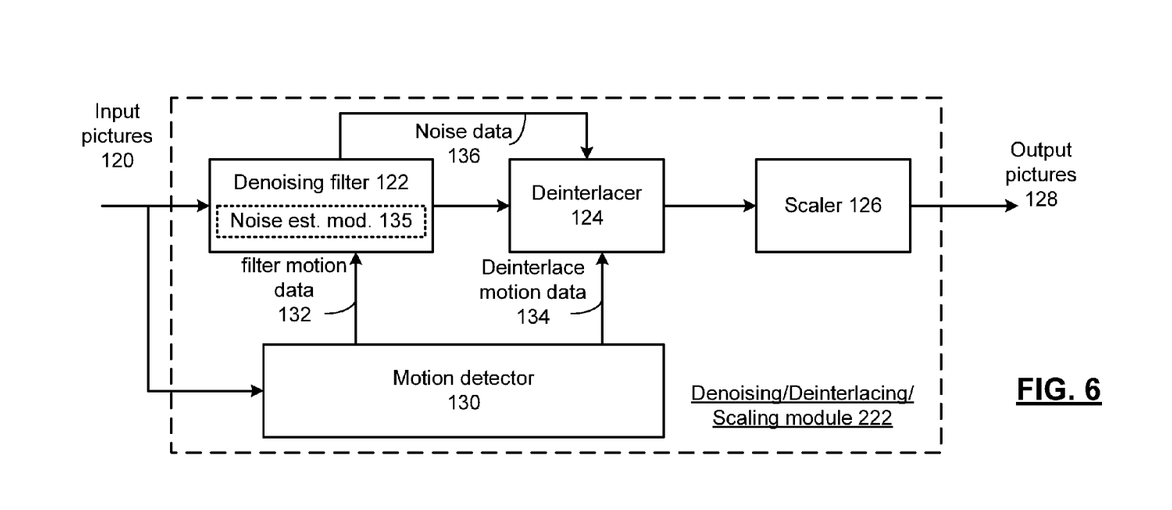
FIG. 6 presents a block diagram representation of a DDS module 222 in accordance with an embodiment of the present invention.

FIG. 6 presents a block diagram representation of a DDS module 222 in accordance with an embodiment of the present invention. DDS module 222 includes an adaptive filter, such as denoising filter 122 for processing input pictures into selectively filtered pictures, based on filter motion data.

Denoising filter 122 can include one or more temporal and/or spatial video filters, a comb filter or deblocking filter that filters noise or video artifacts. Denoising filter 122 is motion adaptive based on filter motion data 132. In one example the denoising filter 122 includes a first filter such as a 2-line, 3-line, 1D, 2D, 3D, 1H, 2H, or other spatial filter that operates to selectively filter a particular pixel. Denoising filter 122 can include a second filter, such as a comb filter, with temporal filtering and motion compensation or spatial filtering that is either adaptive to motion in a video signal or otherwise operates in the presence of motion to filter input pictures 120 without undue degradation of picture quality. In one mode of operation, the denoising filter 122 is selectively enabled or disabled based on the value of the filter motion data 132.

While the adaptation of denoising filter 122 is described above in terms of simply enabling or disabling each filter, other adaptations are likewise possible including providing different filter parameters to one or more filters of denoising filter 122 in either the presence of motion, or based on the amount of motion that is detected. Filter motion data 132 can indicate an amount of motion on either a pixel by pixel basis, or on a picture by picture basis or any portion thereof and can be performed separately for both luma and chroma components.

The deinterlacer 124 includes an interpolator or other device that selectively interpolates the selectively filtered pictures into selectively deinterlaced pictures, based on deinterlace motion data 134. For example, deinterlacer 124 processes the selectively filtered pictures from denoising filter 122 to reconstruct whole frames from interlaced frames, for instance when an interlaced signal is converted to a progressive scan signal, such as a 480p, 720p or 1080p formatted signal. In an embodiment, the interpolator is motion adaptive based on the deinterlace motion data 134 by being enabled in a no-noise or low-noise environment and by being disabled otherwise when a greater amount of motion is detected.

In a further embodiment, the deinterlacer 124 includes both spatial and temporal interpolation and either switches between these two interpolation modes based on deinterlace motion data 134. For example, temporal interpolation can be used for areas of a processed image that include pixels that no motion or an amount of motion that is lower than a motion threshold. In areas of a processed image that include pixels that exhibit motion or an amount of motion that is greater than some motion threshold, the temporal interpolation can be disabled and spatial interpolation can be used to fill in the missing pixels. In other modes of operation, the deinterlacer 124 can operate based on a weighted sum of these two different interpolations based on the deinterlace motion data 134, wherein the weighting favors temporal interpolation for small motion and spatial interpolation for high motion. It should be noted, that deinterlacer 124 can optionally be motion adapted in other ways including the use of other motion adaptive interpolation parameters.

In another embodiment, the denoising filter 122 includes an optional noise estimation module 135 that detects noise and generates noise data 136 that indicates either an amount of noise or the present of noise that exceeds a noise threshold. The noise detection can be performed on either a pixel-by-pixel basis for individual pixels of input picture 120, groups of pixels such as blocks or macroblocks of for the picture as a whole. The denoising filter 122 can be adaptive based on the amount of detected noise. For example, the denoising filter 122 can be selectively disabled in low noise or no noise conditions of the denoising filter coefficients or other parameters can be modified based on the amount of noise detected. In addition, the deinterlacer 124 selectively interpolates the filtered pictures into selectively deinterlaced pictures, further based on the noise data 136. In particular, similar to the adaptation to motion, the deinterlacer 124 can be adaptive to noise levels.

The motion detector 130 generates the filter motion data and the deinterlace motion data, based on detecting motion in the input pictures 120. In an embodiment, the motion detector 130 generates filter motion data 132 for a picture of the input pictures 120 by determining an amount of motion and comparing the amount of motion to a first motion detection threshold while contemporaneously generating the deinterlace motion data 134 for the picture by comparing the amount of motion to a second motion detection threshold. Motion detection can be performed on a pixel-by-pixel basis—allowing a two-pixel resolution when interpolating to form the selectively deinterlaced pictures. It should be noted that filter motion data 132 and deinterlace motion data 134 can include the same quantity or quantities or different quantities that are particular to the detection of motion for the purposes of filtering and deinterlacing. A further description of motion detector 130 is presented in conjunction with FIGS. 7 and 8 that include several optional functions and features.

DDS module 222 further includes a scaler 126 that scales the selectively deinterlaced pictures from deinterlacer 124 to output pictures of a different scale from a scale of the input pictures, to provide a different resolution, for example. In an embodiment, the scaler 126 can include upsampling/upscaling or downsampling/downscaling or other scaling to produce output pictures 128 in a desired video resolution.

It should be noted that while motion detector 130 is shown as being dedicated to DDS module 222, all or part of the functionality of motion detector 130 can be shared with other modules of motion search module 204 or motion refinement module 206. Further in the operation of DDS module 222 in either a decoding or transcoding configuration, portions of the motion detection process can be derived via motion parameters of a previous encoding of input pictures 120.

Figure 7:
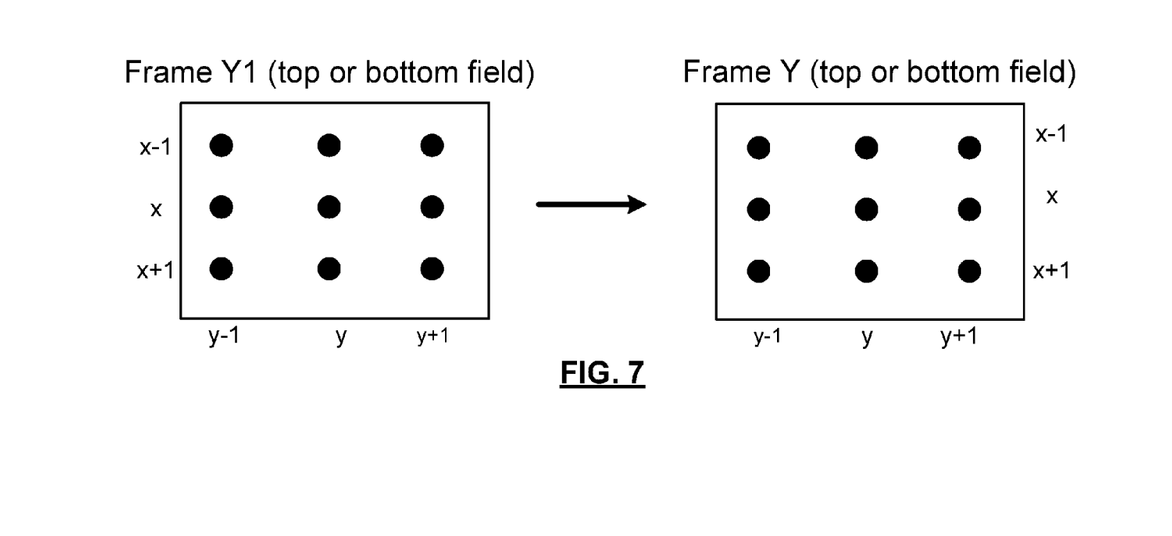
FIG. 7 presents a graphical representation of a pixel matrix from different pictures in accordance with an embodiment of the present invention.

FIG. 7 presents a graphical representation of a pixel matrix from different pictures in accordance with an embodiment of the present invention. In this example, Y represents the current field/frame and Y1 represents the previous field/frame of input pictures 120. For any pixel in an input picture 120, the 9 pixels of a 3 by 3 block centering on the pixel are considered in determining the amount of motion for that particular pixel. The motion detection result is given by:

$$M=\Sigma |Y[i,j]-Y1[i,j]|$$

Where [x, y] is the current pixel for which motion detection is performed, [i j] are 9 pixels around (and including) the current one. In other words, i=(x−1, x, x+1) and j=(y−1, y, y+1). Each pixel in the input pictures 120 can be considered in this fashion to determine an amount of motion for that pixel. It should be noted that the number of neighboring pixels can be less than 8 in circumstances where the pixel being considered is on one or more borders of the picture. It should also be noted that while a neighborhood of 9 pixels is considered, a larger or smaller neighborhood can be used.

Figure 8:
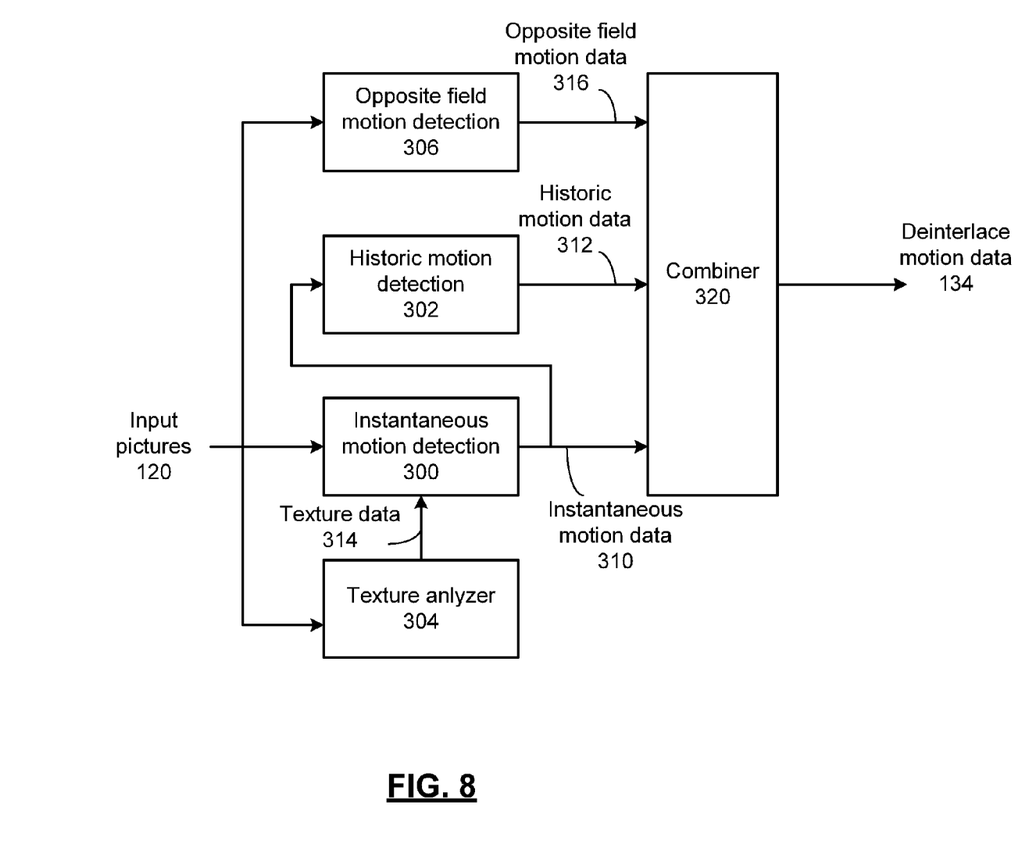
FIG. 8 presents a block diagram data flow representation of a deinterlace motion data generation process in accordance with an embodiment of the present invention.

FIG. 8 presents a block diagram data flow representation of a deinterlace motion data generation process in accordance with an embodiment of the present invention. In particular, a process is shown for operation in conjunction with a motion detector such as motion detector 130 for generating deinterlace motion data 134 based on input pictures 120. In this embodiment, the deinterlace motion data 134 is generated based on instantaneous motion detection 300, historic motion detection 302 and opposite field motion detection 306.

The instantaneous motion detection 300 can operate as described in conjunction with FIG. 7 to generate pixel by pixel motion M and generate instantaneous motion data 310 by comparing the detected motion to a motion threshold. When the amount of detected motion compares unfavorably to the threshold, such as when the amount of detected motion meets or exceeds the threshold, the instantaneous motion data 310 indicates the detection of instantaneous motion. In addition, the process can further include a texture analyzer that generates texture data 314 that indicates a texture of the picture in a region surrounding the individual pixels of the picture. The texture data 314 can indicate for example whether the region surrounding individual pixels of the picture has a smooth texture or a complex texture by comparing the contrast of neighboring pixels. The instantaneous motion detection 300 can adapt the motion detection threshold to favor the detection of motion when the texture data indicates a smooth region surrounding the individual pixels of the picture.

The historic motion detection 302 includes a buffer such as a wagon wheel buffer, ring buffer or other buffer that considers motion for individual pixels over a number N of three or more adjacent pictures having the same field polarity. The amount of motion M can be aggregated over the N pictures and compared with a historic motion detection threshold. When the amount of detected motion compares unfavorably to the threshold, such as when the amount of detected motion meets or exceeds the threshold, the historic motion data 312 indicates the detection of historic motion. It should be noted that, other aggregations such as weighted sums, an exponentially weighted moving average or other filters or windowing can be applied to track the historic motion for individual pixels of input pictures 120.

Opposite field motion detection 306 operates by comparing differences between two adjacent fields of the plurality of pictures having the different field polarity. For example, when pixel values from adjacent lines to be deinterlaced are consistently different in either chroma or luma, opposite field motion data 316 is generated to indicate motion. Combiner 320 generates deinterlace motion data 134 based on a function of opposite field motion data 316, historic motion data 312 and instantaneous motion data 310. For example, the combiner 320 can generate deinterlace motion data 134 to indicate motion when any one of: the opposite field motion data indicates motion, the historic motion data indicates motion, and the instantaneous motion data indicates motion.

Figure 9:
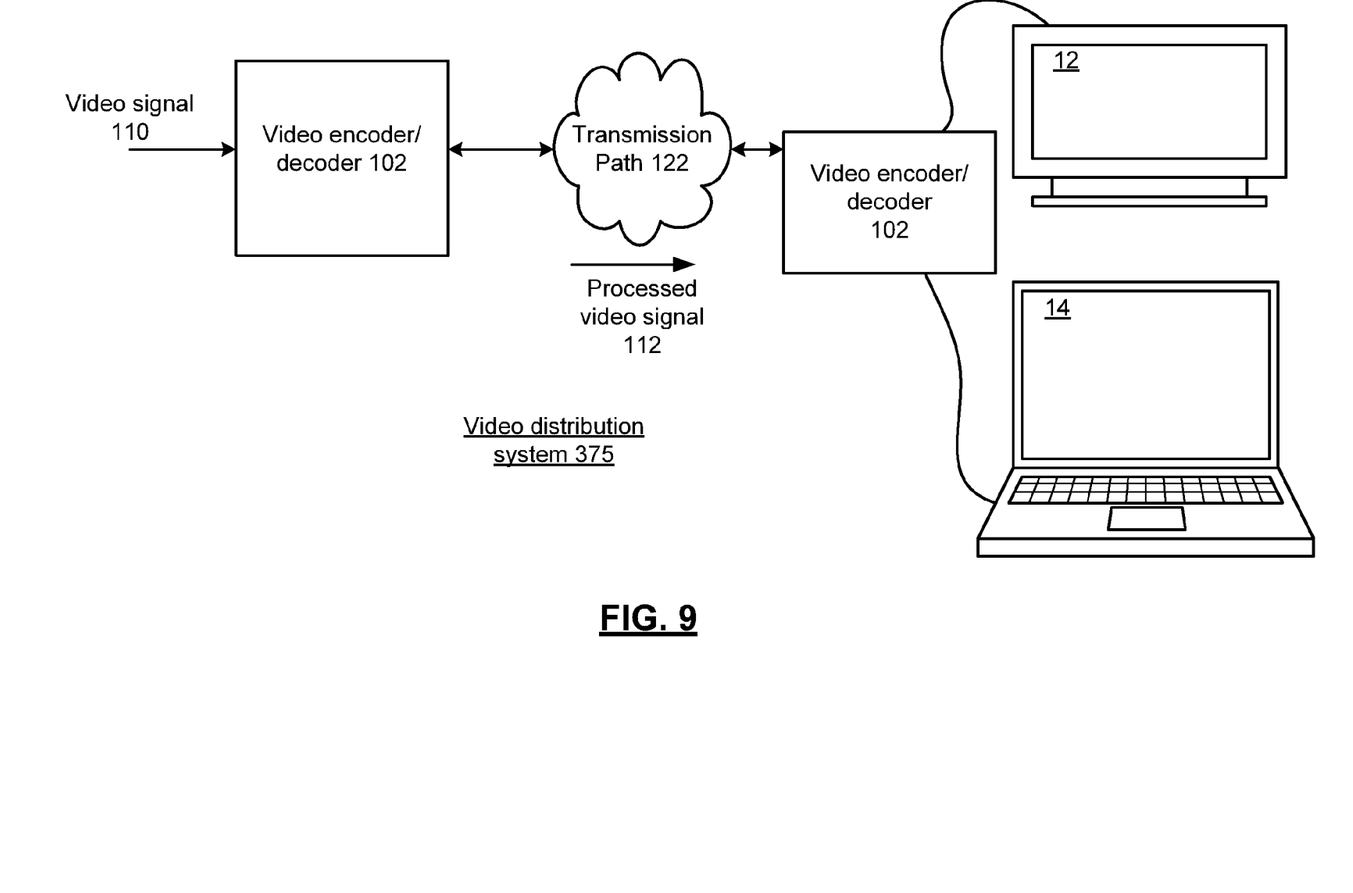
FIG. 9 presents a block diagram representation of a video distribution system 375 in accordance with an embodiment of the present invention.

FIG. 9 presents a block diagram representation of a video distribution system 375 in accordance with an embodiment of the present invention. In particular, processed video signal 112 generated by a first video encoder/decoder 102 that operates as an encoder or transcoder to generate the processed video signal 112. The processed video signal 112 is transmitted via a transmission path 122 to a second video encoder/decoder 102 that operates as a decoder. The second video encoder/decoder 102 operates to decode the processed video signal 112 for display on a display device such as television 12, computer 14 or other display device. While shown as being separate from the television 12 or computer 14, the video encoder/decoder 102 can be incorporated therein.

The transmission path 122 can include a wireless path that operates in accordance with a wireless local area network protocol such as an 802.11 protocol, a WIMAX protocol, a Bluetooth protocol, etc. Further, the transmission path can include a wired path that operates in accordance with a wired protocol such as a Universal Serial Bus protocol, an Ethernet protocol or other high speed protocol.

Figure 10:
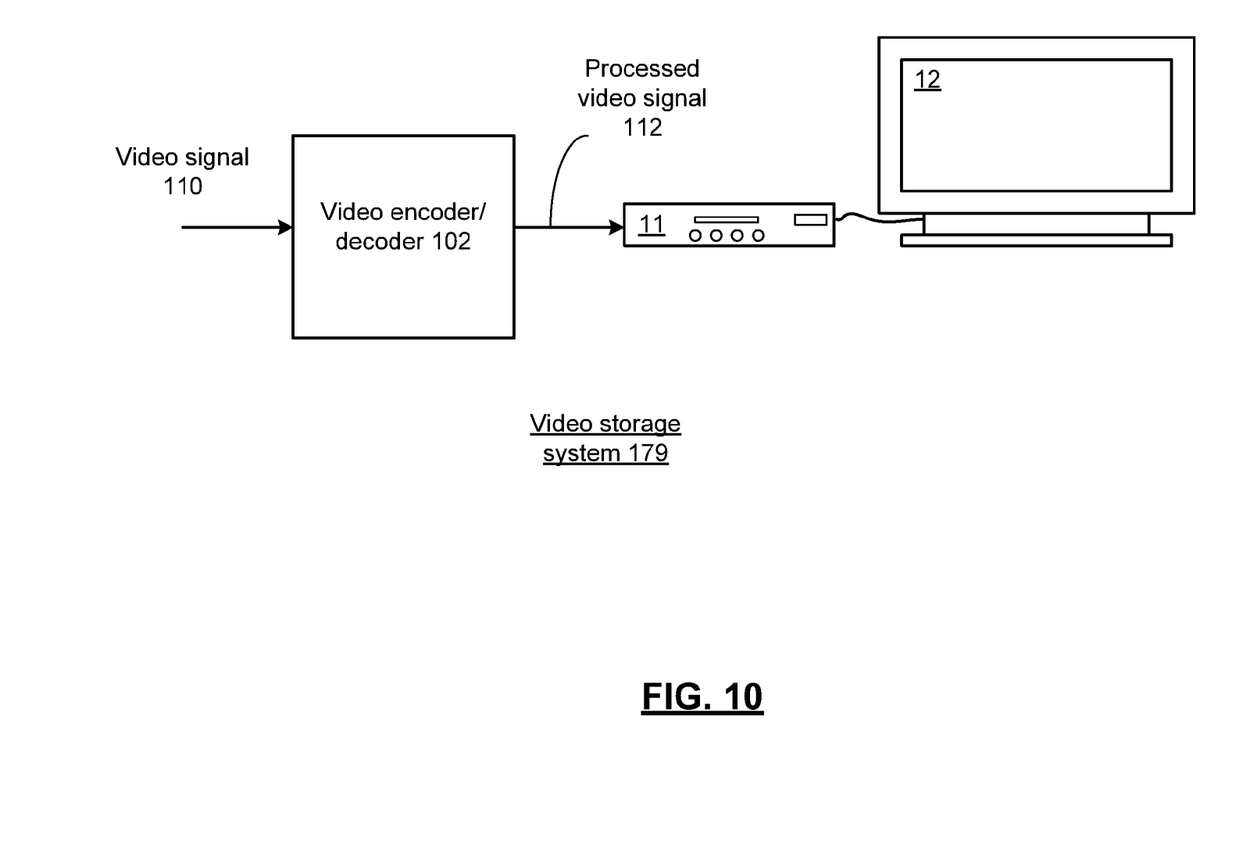
FIG. 10 presents a block diagram representation of a video storage system 179 in accordance with an embodiment of the present invention.

FIG. 10 presents a block diagram representation of a video storage system 179 in accordance with an embodiment of the present invention. In particular, device 11 is a set top box with built-in digital video recorder functionality, a stand alone digital video recorder, a DVD recorder/player or other device that stores the processed video signal 112 for display on video display device such as television 12. While video encoder/decoder 102 is shown as a separate device, it can further be incorporated into device 11. In this configuration, video encoder/decoder 102 can further operate to decode the processed video signal 112 when retrieved from storage to generate a video signal in a format that is suitable for display by video display device 12. While these particular devices are illustrated, video storage system 179 can include a hard drive, flash memory device, computer, DVD burner, or any other device that is capable of generating, storing, decoding and/or displaying the video content of processed video signal 112 in accordance with the methods and systems described in conjunction with the features and functions of the present invention as described herein.

Figure 11:
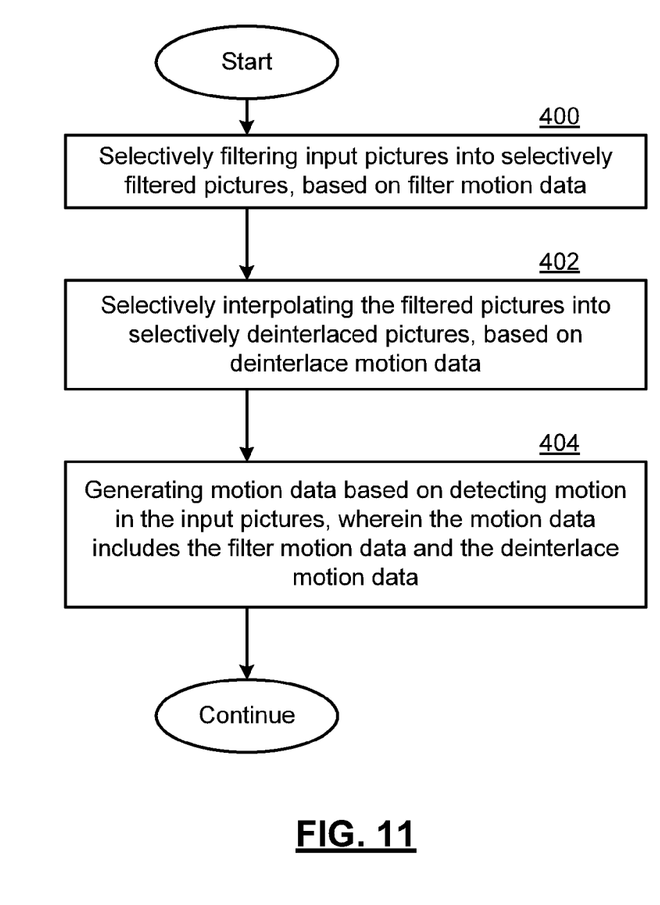
FIG. 11 presents a flowchart representation of a method in accordance with an embodiment of the present invention.

FIG. 11 presents a flowchart representation of a method in accordance with an embodiment of the present invention. In particular, a method is presented for use in conjunction with a video processing device having one or more of the features and functions described in association with FIGS. 1-10. In step 400, input pictures are selectively filtered into selectively filtered pictures, based on filter motion data. In step 402 the filtered pictures are selectively interpolated into selectively deinterlaced pictures, based on deinterlace motion data. In step 404, motion data is generated based on detecting motion in the input pictures, wherein the motion data includes the filter motion data and the deinterlace motion data.

In an embodiment step 404 includes generating the filter motion data for a picture of the input pictures by determining an amount of motion and comparing the amount of motion to a first motion detection threshold and that further generates the deinterlace motion data for the picture by comparing the amount of motion to a second motion detection threshold. Step 404 can include generating the filter motion data for individual pixels of a picture of the input pictures by determining an amount of motion corresponding to the individual pixels and comparing the amount of motion to a first motion detection threshold and that further generates the deinterlace motion data for the individual pixels of the picture by comparing the amount of motion to a second motion detection threshold. Step 400 can include selectively enabling and disabling a denoising filter based on the filter motion data.

Figure 12:
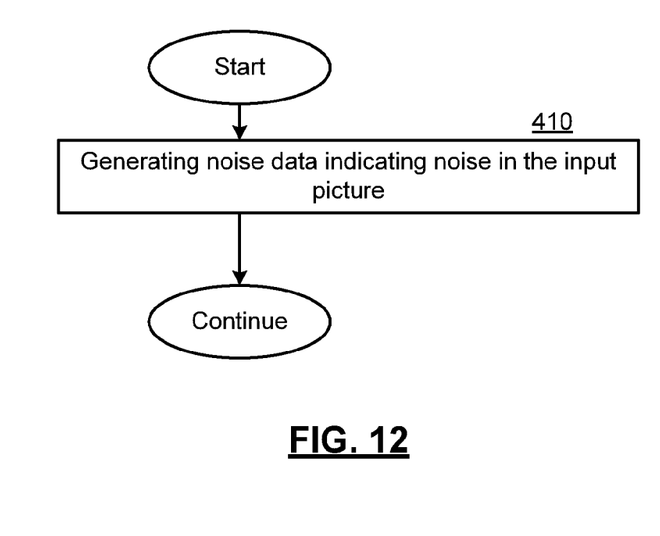
FIG. 12 presents a flowchart representation of a method in accordance with an embodiment of the present invention.

FIG. 12 presents a flowchart representation of a method in accordance with an embodiment of the present invention. In particular, a method is presented for use in conjunction with a video processing device having one or more of the features and functions described in association with FIGS. 1-10. In step 410, noise data is generated indicating noise in the input pictures. Step 402 can include selectively enabling and disabling an interpolator, based on the deinterlace motion data and the noise data.

Figure 13:
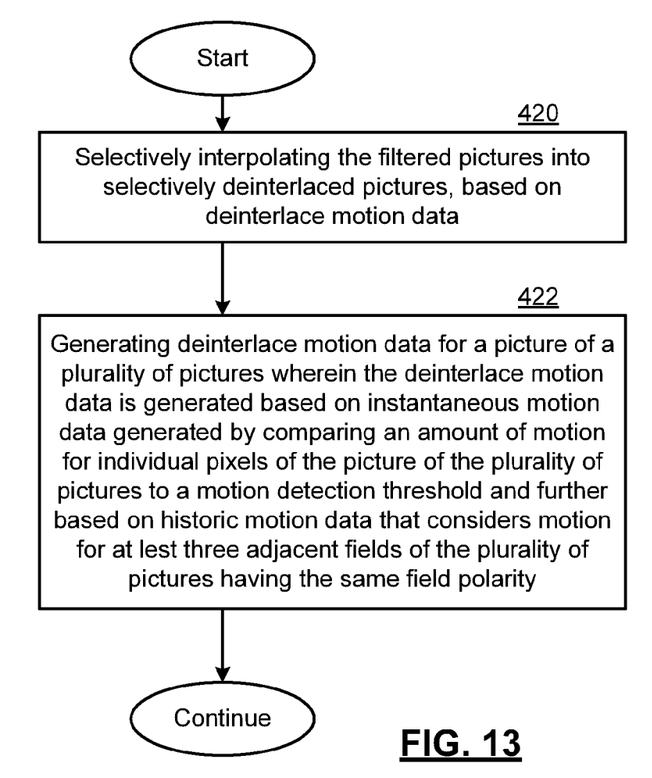
FIG. 13 presents a flowchart representation of a method in accordance with an embodiment of the present invention.

FIG. 13 presents a flowchart representation of a method in accordance with an embodiment of the present invention. In particular, a method is presented for use in conjunction with a video processing device having one or more of the features and functions described in association with FIGS. 1-12. In step 420, a plurality of pictures are selectively interpolated into a plurality of selectively deinterlaced pictures, based on deinterlace motion data. In step 422, the deinterlace motion data is generated for a picture of the plurality of pictures, based on both: instantaneous deinterlace motion data generated by comparing an amount of motion for individual pixels of the picture of the plurality of pictures to a motion detection threshold; and historic motion data that considers motion for at least three adjacent pictures of the plurality of pictures having the same field polarity.

In an embodiment, the deinterlace motion data for a picture of the plurality of pictures is generated to indicate motion when any one of: the historic motion data indicates motion, and the instantaneous motion data indicates motion. The deinterlace motion data can be generated further based on opposite field motion data that compares differences between two adjacent pictures of the plurality of pictures having the different field polarity. In this case, the deinterlace motion data for a picture of the plurality of pictures can be generated to indicate motion when any one of: opposite field motion data indicates motion, the historic motion data indicates motion, and the instantaneous motion data indicates motion.

In an embodiment, the motion detection threshold is adapted based on texture data that indicates motion based on determining a texture of the picture in a region surrounding the individual pixels of the picture. The texture data can indicates at least one of: a smooth region surrounding the individual pixels of the picture, and a complex region surrounding the individual pixels of the picture. In this case, the motion detection threshold can be adapted to favor the detection of motion when the texture data indicates a smooth region surrounding the individual pixels of the picture.

Figure 14:
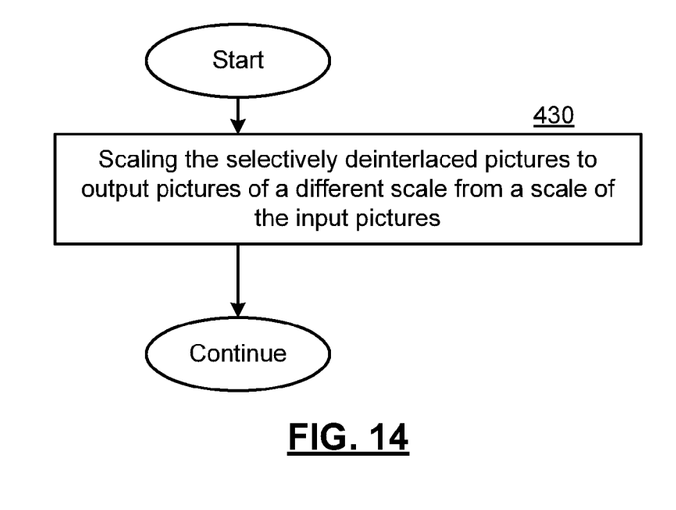
FIG. 14 presents a flowchart representation of a method in accordance with an embodiment of the present invention.

FIG. 14 presents a flowchart representation of a method in accordance with an embodiment of the present invention. In particular, a method is presented for use in conjunction with a video processing device having one or more of the features and functions described in association with FIGS. 1-13. In step 430, the selectively deinterlaced pictures are scaled into output pictures of a different scale from a scale of the input pictures.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A device for use in conjunction with a video processing device, the device comprising:
   a deinterlacer that selectively interpolates first pictures into selectively deinterlaced pictures, wherein the deinterlacer determines selective ones of the first pictures to interpolate and other selected ones of the first pictures to not interpolate, based on an amount of motion indicated by deinterlace motion data; and
   a motion detector, coupled to the deinterlacer, that generates the deinterlace motion data, based on detecting motion in input pictures.

2. The device of claim 1 further comprising:
   an adaptive filter, coupled to the deinterlacer for processing input pictures into the first pictures, based on filter motion data.

3. The device of claim 2 wherein the motion detector is further coupled to the adaptive filter and generates the filter motion data based on detecting the motion in the input pictures.

4. The device of claim 3 wherein the motion detector generates the filter motion data for a picture of the input pictures by determining an amount of motion and comparing the amount of motion to a first motion detection threshold and that further generates the deinterlace motion data for the picture by comparing the amount of motion to a second motion detection threshold.

5. The device of claim 3 wherein the motion detector generates the filter motion data for individual pixels of a picture of the input pictures by determining an amount of motion corresponding to the individual pixels and comparing the amount of motion to a first motion detection threshold and that further generates the deinterlace motion data for the individual pixels of the picture by comparing the amount of motion to a second motion detection threshold.

6. The device of claim 2 wherein the adaptive filter includes a denoising filter that is selectively enabled and disabled based on the filter motion data.

7. The device of claim 2 wherein the adaptive filter further generates noise data indicating noise in the input pictures.

8. The device of claim 7 wherein the deinterlacer selectively interpolates the first pictures into selectively deinterlaced pictures, further based on the noise data.

9. The device of claim 1 further comprising:
   a scaler, coupled to the deinterlacer, that scales the selectively deinterlaced pictures to output pictures of a different scale from a scale of the input pictures.

10. A method for use in conjunction with a video processing device, the method comprising:
    selectively interpolating first pictures into selectively deinterlaced pictures, by determining selective ones of the first pictures to interpolate based on an amount of motion indicated by deinterlace motion data; and
    generating motion data based on detecting motion in input pictures, wherein the motion data includes the deinterlace motion data.

11. The method of claim 10 further comprising:
    selectively filtering input pictures into the first pictures, based on filter motion data.

12. The method of claim 11 further comprising:
    generating the filter motion data based on detecting the motion in the input pictures, wherein the filter motion data is generated separately from the deinterlace motion data.

13. The method of claim 12 wherein generating the motion data includes generating the filter motion data for a picture of the input pictures by determining an amount of motion and comparing the amount of motion to a first motion detection threshold and that further generates the deinterlace motion data for the picture by comparing the amount of motion to a second motion detection threshold.

14. The method of claim 12 wherein generating the motion data includes generating the filter motion data for individual pixels of a picture of the input pictures by determining an amount of motion corresponding to the individual pixels and comparing the amount of motion to a first motion detection threshold and that further generates the deinterlace motion data for the individual pixels of the picture by comparing the amount of motion to a second motion detection threshold.

15. The method of claim 11 wherein selectively filtering the input pictures includes selectively enabling and disabling a denoising filter based on the filter motion data.

16. The method of claim 10 further comprising generating noise data indicating noise in the input pictures.

17. The method of claim 16 wherein selectively interpolating the first pictures into selectively deinterlaced pictures, includes selectively enabling and disabling an interpolator, based on the deinterlace motion data and the noise data.

18. The method of claim 10 further comprising:
scaling the selectively deinterlaced pictures to output pictures of a different scale from a scale of the input pictures.

19. A device for use in conjunction with a video processing device, the device comprising:
a filter that generates noise data indicating noise in input pictures;
a deinterlacer, coupled to the filter, that selectively interpolates first pictures that are generated based on the input pictures into selectively deinterlaced pictures, wherein the deinterlacer determines selective ones of the first pictures to interpolate and other selected ones of the first pictures to not interpolate, based on an amount of noise indicated by the noise data.

\* \* \* \* \*